United States Patent [19]
Mitobe et al.

[11] Patent Number: 5,273,014
[45] Date of Patent: Dec. 28, 1993

[54] INTAKE SYSTEM FOR ENGINE

[75] Inventors: Noriaki Mitobe; Masaki Harada; Kouichirou Waki; Takuro Shigemura; Isao Shimizu; Isamu Iguchi; Masatoshi Shoji; Masaru Shimada; Hiroyuki Chado, all of Hiroshima, Japan

[73] Assignee: Mazda Motor Corporation, Hiroshima, Japan

[21] Appl. No.: 893,419

[22] Filed: Jun. 8, 1992

[30] Foreign Application Priority Data

Jun. 11, 1991 [JP] Japan ................... 3-138983
Sep. 12, 1991 [JP] Japan ............... 3-073591[U]
Sep. 12, 1991 [JP] Japan ................... 3-233417
Sep. 24, 1991 [JP] Japan ................... 3-243137

[51] Int. Cl.$^5$ ............................................. F02D 9/08
[52] U.S. Cl. ................................. 123/336; 123/308
[58] Field of Search ............. 123/308, 432, 336, 337, 123/568

[56] References Cited

U.S. PATENT DOCUMENTS

| | | | |
|---|---|---|---|
| 4,317,438 | 3/1982 | Yagi et al. | 123/308 |
| 4,494,504 | 1/1985 | Yagi et al. | 123/308 |
| 4,702,207 | 10/1987 | Hatamura et al. | 123/308 |
| 4,892,076 | 1/1990 | Toshimits et al. | 123/308 |
| 5,167,211 | 1/1992 | Fukuma et al. | 123/337 |

FOREIGN PATENT DOCUMENTS

| | | | |
|---|---|---|---|
| 3514327 | 10/1985 | Fed. Rep. of Germany | 123/308 |
| 61-57166 | 4/1986 | Japan . | |
| 1-119833 | 8/1989 | Japan . | |
| 930741 | 7/1963 | United Kingdom . | |

Primary Examiner—E. Rollins Cross
Assistant Examiner—Erick Solis
Attorney, Agent, or Firm—Sixbey, Friedman, Leedom & Ferguson

[57] ABSTRACT

An intake system for a multiple-cylinder engine a plurality of primary discrete intake passages and a plurality of secondary discrete intake passages. Each pair of primary discrete intake passage and the secondary discrete intake passage communicate with one of the cylinders. Both the primary and secondary discrete intake passages are straight and the primary discrete intake passage is provided with a primary valve member which is provided with an opening and is selectively positioned in a closed position where the primary valve member limits the effective cross-sectional area of the primary discrete intake passage to the cross-sectional area of the opening and in an open position where the primary valve member wide opens the primary intake passage. The secondary discrete intake passage is provided with a secondary valve member which is moved between a closed position where it substantially closes the secondary discrete intake passage and an open position where it wide opens the secondary discrete intake passage.

20 Claims, 12 Drawing Sheets

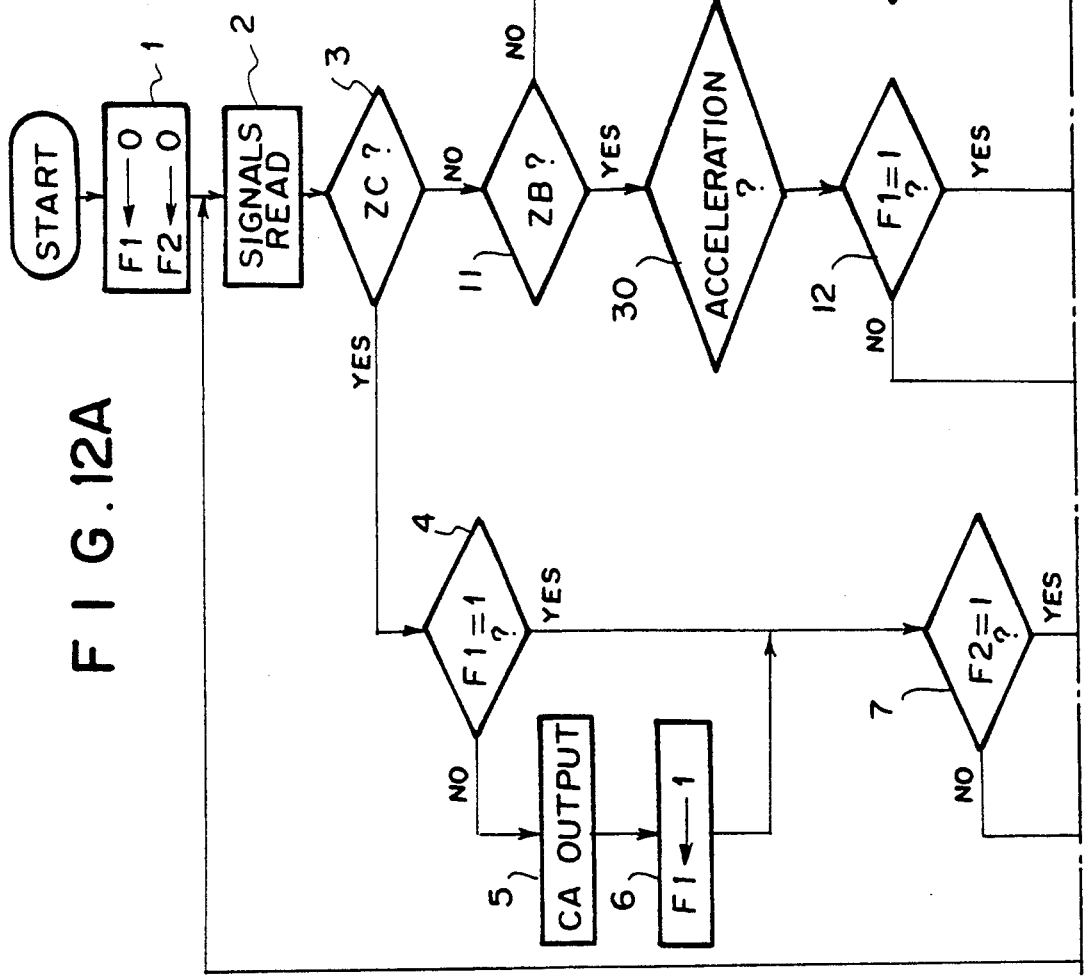

INTAKE SYSTEM FOR ENGINE

BACKGROUND OF THE INVENTION

1. Field of the Invention

This invention relates to an intake system for an engine, and more particularly to an intake system for an engine having a primary intake passage which is opened during operation of the engine under light load and a secondary intake passage which is opened during operation of the engine under heavy load.

2. Description of the Prior Art

In the intake system of an engine disclosed in Japanese Unexamined Utility Model Publication No. 61(1986)-57166, there are provided primary and secondary intake passages for each of the cylinders, the primary intake passage being opened during a light load operation of the engine and being curved in order to form swirl of intake air in the combustion chamber and the secondary intake passage being opened during a heavy load operation of the engine. In the intake system, when the engine is operating under light load, intake air is introduced into the combustion chamber only through the primary intake passage, thereby forming swirl of intake air so that fuel is better mixed with air, and when the engine is operating under heavy load, intake air is introduced into the combustion chamber through both the primary and secondary intake passages, thereby ensuring sufficient amount of intake air.

However the intake resistance through a curved intake passage is inherently higher than that through a straight intake passage. Accordingly, when the primary intake passage is curved in order to form swirl of intake air during a light load operation of the engine, the amount of intake air is apt to be short during a heavy load operation of the engine due to high intake resistance through the curved primary intake passage even if both the primary and secondary intake passages are opened.

SUMMARY OF THE INVENTION

In view of the foregoing observations and description, the primary object of the present invention is to provide an intake system for an engine which can form swirl of intake air during light load operation of the engine while the intake resistance through the primary intake passage can be reduced so that a sufficient amount of intake air can be ensured during a heavy load opera ion of the engine.

The intake system of the present invention is characterized in that both the primary and secondary intake passages are straight and the primary intake passage is provided with a valve member which is provided with an opening and is selectively positioned in a closed position where the valve member limits the effective cross-sectional area of the primary intake passage to the cross-sectional area of the opening and in an open position where the valve member wide opens the primary intake passage.

When the engine is operating under light load, the secondary intake passage is closed and the valve member in the primary intake passage is positioned in the closed position, whereby intake air flows only through the primary intake passage and the flow speed of the intake air is increased when passing through the opening of the valve member, thereby facilitating formation of swirl of intake air. On the other hand, when the engine is operating under heavy load, the secondary intake passage is opened and the valve member in the primary intake passage is positioned in the open position, whereby intake air flows through both the primary and secondary intake passages. At this time, since the primary intake passage is wide opened and the primary and secondary intake passages are both straight, the intake resistance is small, whereby a sufficient amount of intake air can be ensured during a heavy load operation of the engine.

In one preferred embodiment of the present invention, a partition member is provided in the primary intake passage downstream of the valve member and forms a swirl forming passage, in the primary intake passage, which substantially conforms to the opening of the valve member in cross-section and communicates the opening with the combustion chamber.

With this arrangement, formation of the swirl is further facilitated.

In another preferred embodiment of the present invention, a light load fuel supply means is provided in the swirl forming passage in the primary intake passage and a heavy load fuel supply means is provided upstream of the upstream ends of the primary and secondary intake passages where the primary and secondary intake passages merge together. During a light load operation of the engine, the light load fuel supply means is operated to supply fuel to the swirl forming passage and during a heavy load operation engine, the heavy load fuel supply means is operated to supply fuel to both the primary and secondary intake passages.

DESCRIPTION OF THE PREFERRED EMBODIMENT

Figure 1:
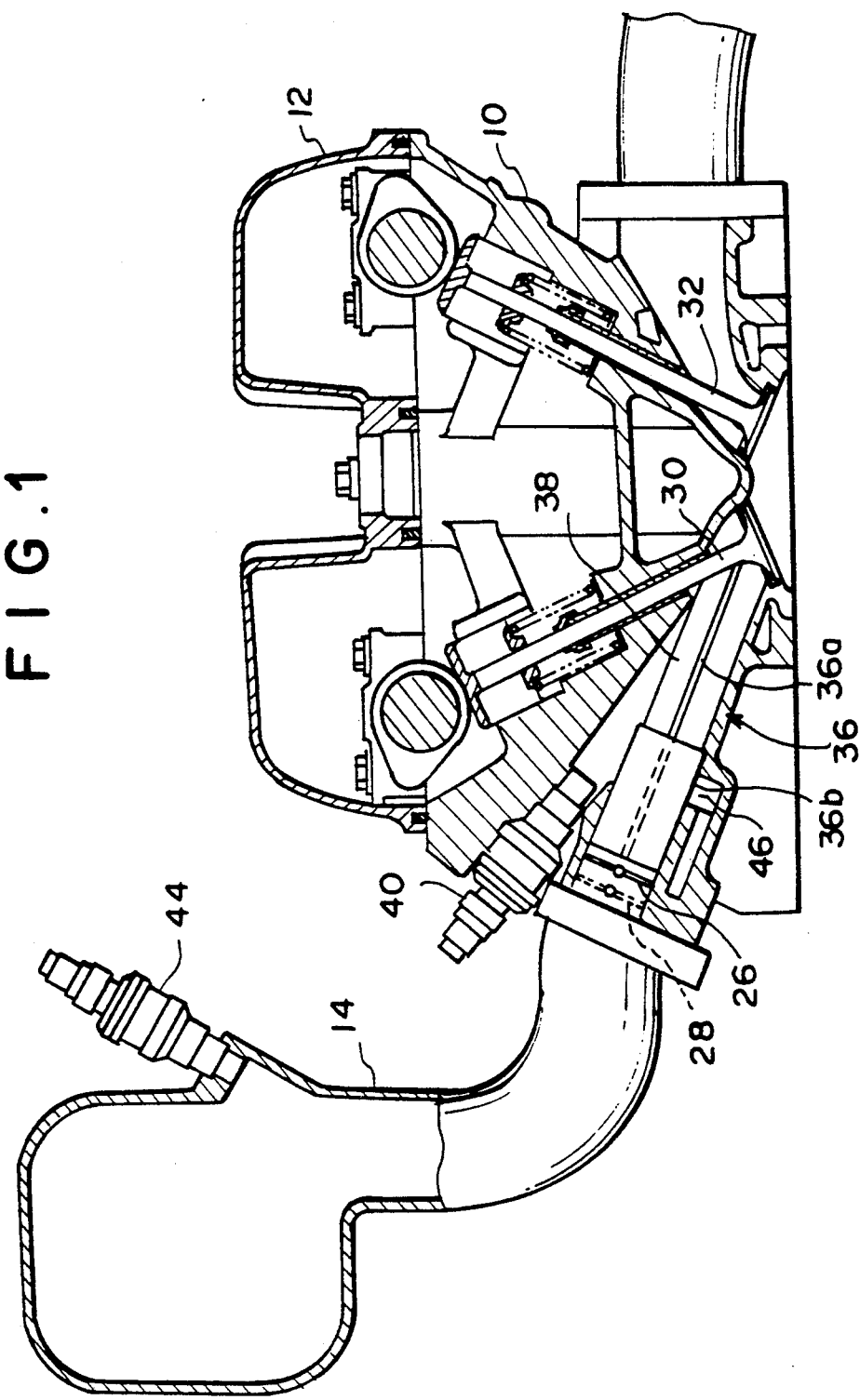
FIG. 1 is a cross-sectional view of an engine provided with an intake system in accordance with an embodiment of the present invention.
Figure 2:
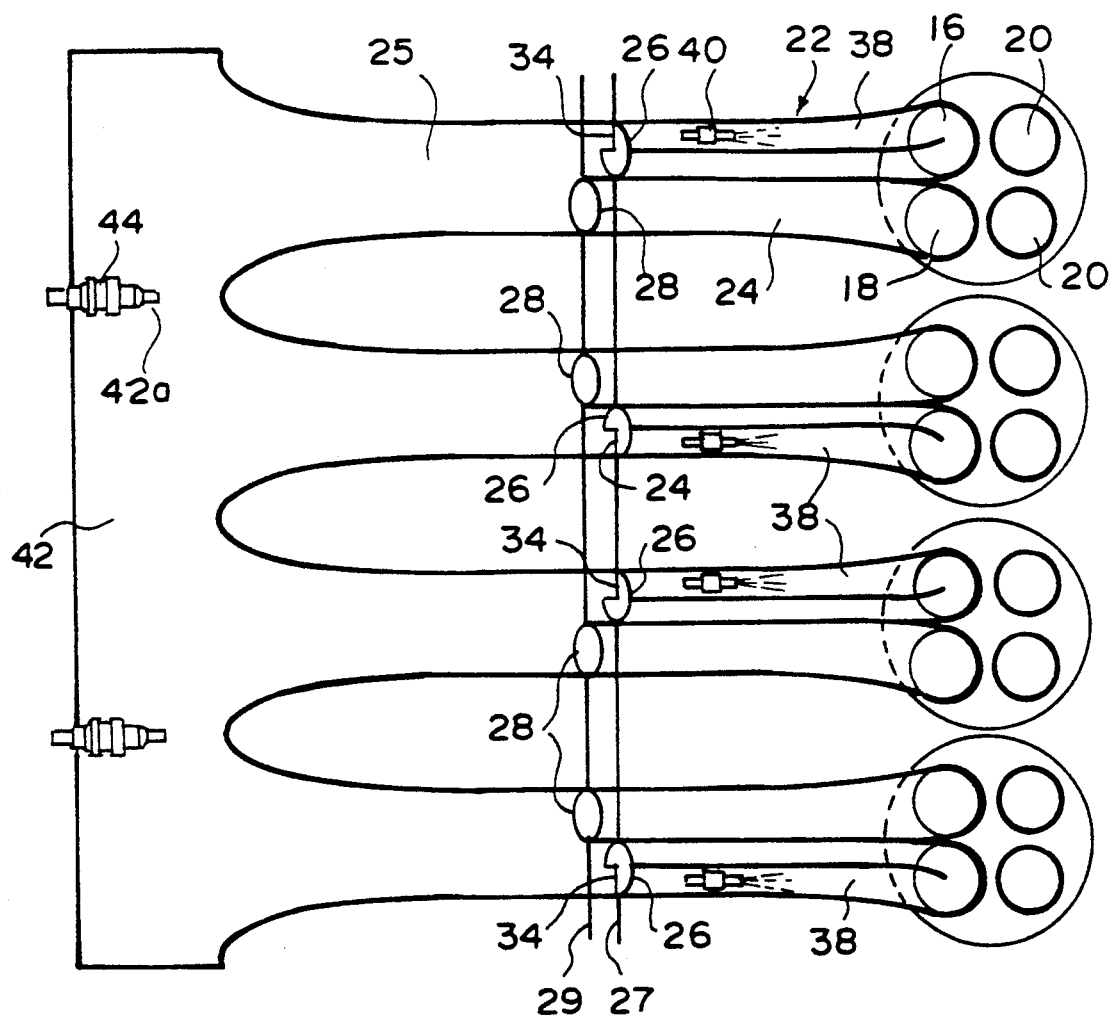
FIG. 2 is a schematic view showing the state of the intake system during the light load operation of the engine.
Figure 3:
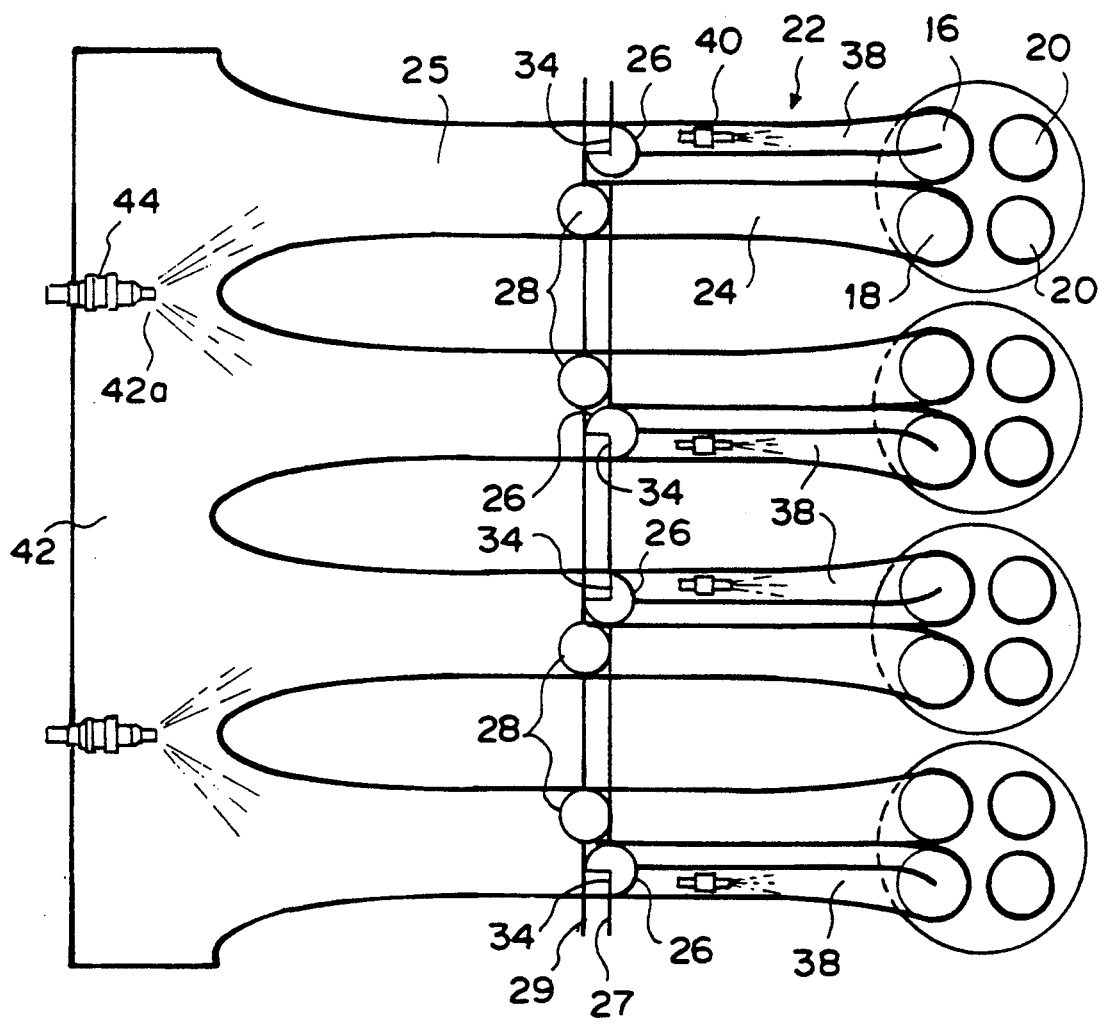
FIG. 3 is a schematic view showing the state of the intake system during the heavy load operation of the engine.

In FIGS. 1 to 3, a four-cylinder in-line engine has four cylinders C. In FIG. 1, reference numerals 10, 12 and 14 respectively denote a cylinder head, a head cover and an intake manifold.

As shown in FIGS. 2 and 3, an intake system for the engine in accordance with an embodiment of the present invention comprises four discrete intake passages 25 which are communicated with the atmosphere by way of a common intake passage 130 (FIG. 6) and each of which communicates with one of the cylinders C. The downstream end portion of each discrete intake passages 25 is bifurcated into primary and secondary intake passages 22 and 24 both of which straight. The primary and secondary intake passages 22 and 24 open to the cylinder C respectively at intake ports 16 and 18. An exhaust system open to each cylinder at a pair of exhaust ports 20.

Each primary intake passage 22 is provided with a primary valve 26 at the upstream end thereof and each secondary intake passage 24 is provided with a secondary valve 28 at the upstream end thereof. The primary valves 26 of the respective primary intake passages 22 are connected to a valve shaft 27 and are moved between a closed position shown in FIG. 2 and an open position shown in FIG. 3 by way of the valve shaft 27. Each primary valve 26 is provided with a cutaway portion 34 which is a quadrant in shape, and when the primary valve 26 is in the closed position, intake air can flow through the primary intake passage 22 only passing through the cutaway portion 34, that is, the effective cross-sectional area of the primary intake passage 22 is limited to the cross-sectional area of the cutaway portion 34. In the open position, it permits intake air to flow through the primary intake passage 22 substantially over the entire cross-sectional area thereof. The secondary valves 28 of the respective secondary intake passages 24 are connected to a valve shaft 29 and are moved between a closed position shown in FIG. 2 and an open position shown in FIG. 3 by way of the valve shaft 29. In the closed position, the secondary valve 28 fully closes the secondary intake passage 24 and in the open position, the secondary valve 28 wide opens the same.

FIG. 1 is a cross-sectional view showing the part where the primary intake passage 22 is formed. In FIG. 1, reference numerals 30 and 32 respectively denote an intake valve which opens and closes the intake port 16 of the primary intake passage 22 and an exhaust valve which opens and closes the exhaust port 20.

Figure 4:
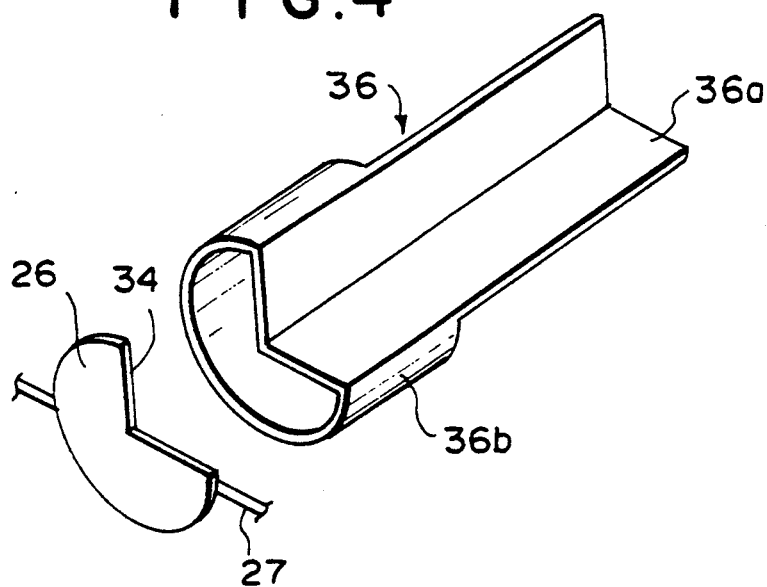
FIG. 4 is an exploded perspective view of the primary valve and the insert member.

An insert member 36 comprising a partition wall portion 36a the cross-section of which is L-shaped so as to conform to the cutaway portion 34 of the primary valve 26 and a tubular portion 36b which is formed integrally with the upstream end portion of the partition wall portion 36a and is a three-quarter circle in cross-section as shown in FIG. 4 is inserted into the primary intake passage 22 so that a swirl forming passage 38 which is aligned with the cutaway portion 34 of the primary valve 26 and communicates the cutaway portion 34 with the cylinder C is formed between the partition wall portion 36a and the inner surface of the primary intake passage 22. The tubular portion 36b serves to fix the insert member 36 in place in the primary intake passage 22.

A first fuel injector 40 is provided in each of the swirl forming passage 38 as shown in FIGS. 2 and 3. As clearly shown in FIGS. 2 and 3, the four discrete intake passages 25 merge together at a junction portion 42 and a pair of second fuel injectors 44 is provided in the junction portion 42 at portions where a pair of adjacent discrete intake passages 25 merge together. Thus one second fuel injector 44 injects fuel for two adjacent discrete intake passages 25.

As shown in FIG. 1, an exhaust gas recirculation passage 46 is formed in the vicinity of each insert member 36. Exhaust flowing through the exhaust gas recirculation passage 46 heats the insert member 36 and returns to the exhaust system. By heating the insert member 36, evaporation of fuel which adheres to the insert member 36 after injected from the first fuel injector 40 is promoted.

Figure 5A:
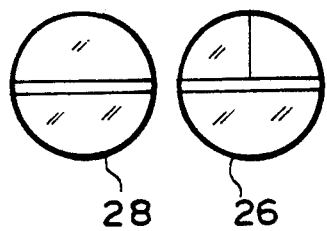
FIGS. 5a to 5c are views for illustrating opening and closure of the primary valve and the secondary valve.
Figure 5B:
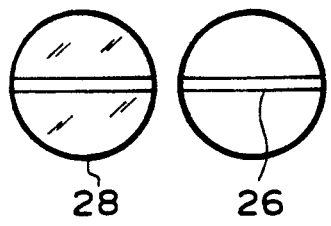
Figure 5C:
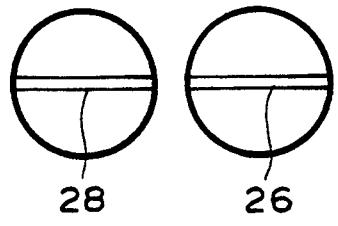

In a light load range where the engine is operating at a low speed under light load, both the primary and secondary valves 26 and 28 are positioned in the closed position as shown in FIGS. 2 and 5a and fuel is injected only from the first fuel injectors 40. In this state, intake air is introduced into the combustion chambers only through the primary intake passage 22 passing through the cutaway portions 34 of the primary valves 26. The flow speed of the intake is increased when passing through the cutaway portion 34 and is kept at the increased speed by the swirl forming passage 38, whereby swirl of intake air is formed in the combustion chamber and air and fuel are better mixed together. At this time, since fuel is supplied only to the swirl forming passage 38, fuel supply efficiency is improved. Further since the first fuel injectors 240 are positioned downstream of the primary valves 26, the amount of fuel adhering to the primary intake passages 22 during light load operation of the engine is minimized.

In a middle load range where the engine is operating at a low speed under middle load, the primary valves 26 are positioned in the open position while the secondary valves 28 are held in the closed position and fuel is injected from both the first and fuel injectors 40 and 44. When the primary valves 26 are in the open position, intake resistance through the primary intake passage 22 is reduced and intake efficiency is improved though swirl of intake air is not formed.

In a heavy load range where the engine is operating at a high speed or at a low speed under heavy load, both the primary and secondary valves 26 and 28 are positioned in the open position and fuel is injected from both the first and fuel injectors 40 and 44. In this state; intake air is introduced into the combustion chambers through both the primary and secondary intake passages 22 and 24 which are straight in shape and have small intake resistance, and accordingly a large amount of intake air can be fed to the combustion chambers.

In the middle load range and the heavy load range, an optimal air-fuel mixture can be fed to the combustion chambers by setting the amount of fuel to be injected from the secondary valves 44 to be larger than that to be injected from the primary valves 40.

Now control of the primary and secondary valves 26 and 28 and the first and second fuel injectors 40 and 44 will be described in more detail with reference to FIGS. 6 to 8, hereinbelow.

Figure 6:
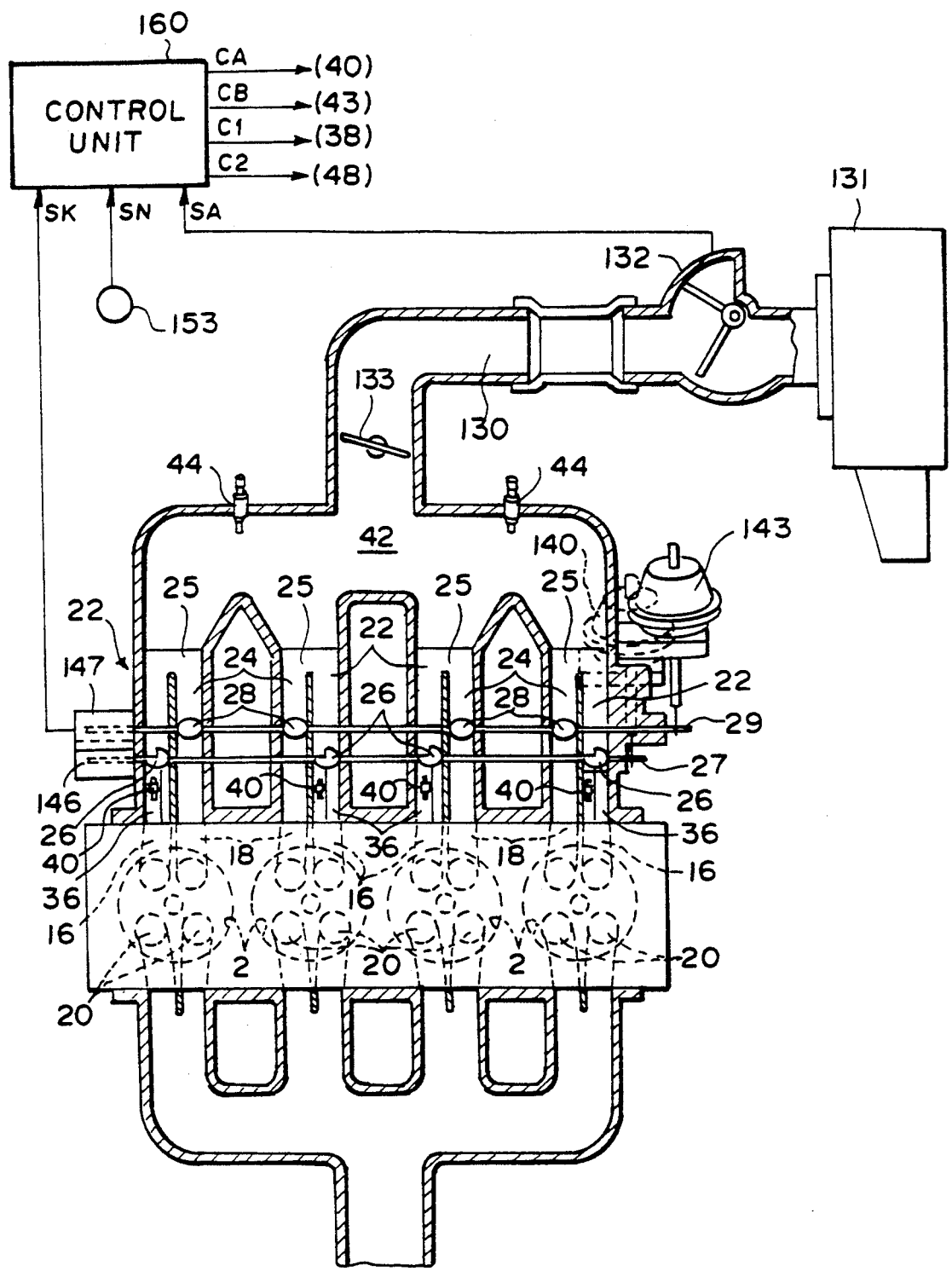
FIG. 6 is another cross-sectional view of the engine shown in FIG. 1 for illustrating the intake system in more detail.

As shown in FIG. 6, the discrete intake passages 25 merge together at the junction portion 42 (a surge tank)

into the common intake passage 130 which opens to the atmosphere by way of an air cleaner 131. The common intake passage 130 is provided with an airflow sensor 132 and a throttle valve 133.

The valve shaft 27 for the primary valves 26 is driven by a first actuator 140 by way of a link mechanism, and a first valve position sensor 146 is mounted on the valve shaft 27 to detect whether the primary valves 26 are in the closed position or in the open position through the angular position of the valve shaft 27. Similarly the valve shaft 29 for the secondary valves 28 is driven by a second actuator 143 by way of a link mechanism, and a second valve position sensor 147 is mounted on the valve shaft 29 to detect whether the secondary valves 28 are in the closed position or in the open position through the angular position of the valve shaft 29.

A control unit 160 controls the primary valves 26, the secondary valves 28, the first fuel injectors 40 and the second fuel injectors 44. The control unit 160 receives an output signal SA from the airflow sensor 132, an output signal SK from the second valve position sensor 147, and an output signal SN from an engine speed sensor 153, and outputs driving signals CA and CB to the first and second actuators 140 and 143 and injection pulse signals C1 and C2 to the first and second fuel injectors 40 and 44.

Figure 7:
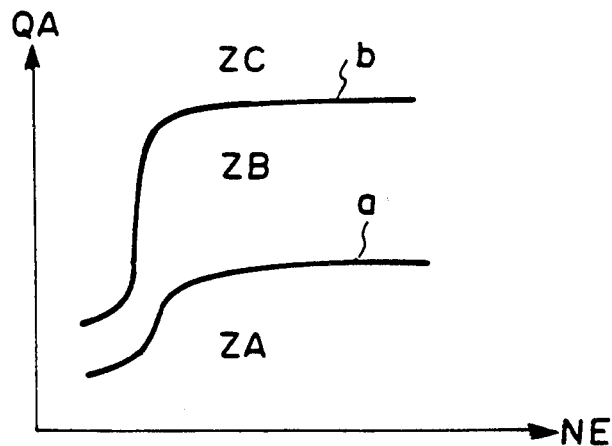
FIG. 7 is a view for illustrating the operational ranges of the engine.

The control unit 160 has a built-in memory in which a data map in which operational ranges of the engine are related to the amount of intake air QA and the engine speed NE as shown in FIG. 7 has been stored. In the data map shown in FIG. 7, the range ZA below line a is the light load range where the amount of intake air QA is small relative to the engine speed, the range ZB between line a and line b is the middle load range where the amount of intake air QA is middle relative to the engine speed NE and the range ZC above line b is the heavy load range where the amount of intake air QA is large relative to the engine speed NE.

The control unit 160 determines which operational range the engine is according to the date map on the basis of the amount of intake air QA and the engine speed NE as represented by the output signals SA and SN. When it is determined that the engine is operating in the light load range ZA, the control unit 160 outputs none of the driving signals CA and CB and outputs the injection pulse signal C1 at a predetermined timing, whereby the primary valves 26 and the secondary valves 28 are positioned in the respective closed positions and the first fuel injectors 40 are caused to inject fuel.

When it is determined that the engine operating in the middle load range ZB, the control unit 160 outputs the driving signal CA to the first actuator 140 while does not output the driving signal CB to the second actuator 143 and outputs the injection pulse signals C1 and C2 to the fuel injectors 40 and 44, whereby the primary valves 26 are moved to the open position while the secondary valves 28 are held in the closed position and the first and second fuel injectors 40 and 44 are caused to inject fuel at a predetermined timing.

When it is determined that the engine is operating in the heavy load range ZC, the control unit 160 outputs the driving signals CA and CB and outputs the injection pulse signals C1 and C2 at a predetermined timing, whereby the primary valves 26 and the secondary valves 28 are moved to the respective open positions and the first and second fuel injectors 40 and 42 are caused to inject fuel.

For example, when trouble occurs in the driving system of the secondary valves 28, in the second actuator 143, the secondary valves 28 themselves, or the link mechanism connecting the valve shaft 129 and the second actuator 143 and the secondary valves 28 cannot be moved to the closed position during the light load operation or the middle load operation of the engine, the second valve position sensor 147 detects it and outputs an output signal SK to the control unit 160. Upon receipt of the output signal SK, the control unit 160 interrupt output of the injection pulse signal C1 to the first fuel injectors 40 and instead outputs the injection pulse signal C2 to the second fuel injectors 44.

In this state, since intake air flows through both the primary and second intake passages 22 and 24 and the flow speed of intake air is relatively low, fuel injected from each of the second fuel injectors 44 spreads wide and is uniformly distributed to the two discrete intake passages 25 opposed to the second fuel injector 44. Further since the primary and secondary intake passages 22 and 24 in the two discrete intake passages 25 opposed to each second fuel injector 44 are arranged symmetrically about the axis of injection of the second fuel injector 44 as can be understood from FIG. 6, fuel injected from the second fuel injector 44 can be uniformly distributed to the primary intake passages 22 in the two discrete intake passages 25 opposed to the second fuel injector 44 and to the secondary intake passages 24 in the two discrete intake passages 25 opposed to the second fuel injector 44. Accordingly, even if the secondary valves 28 cannot be moved to the closed position during the light load operation or the middle load operation of the engine, intake air can be well mixed with fuel and engine stall can be prevented.

Figure 8:
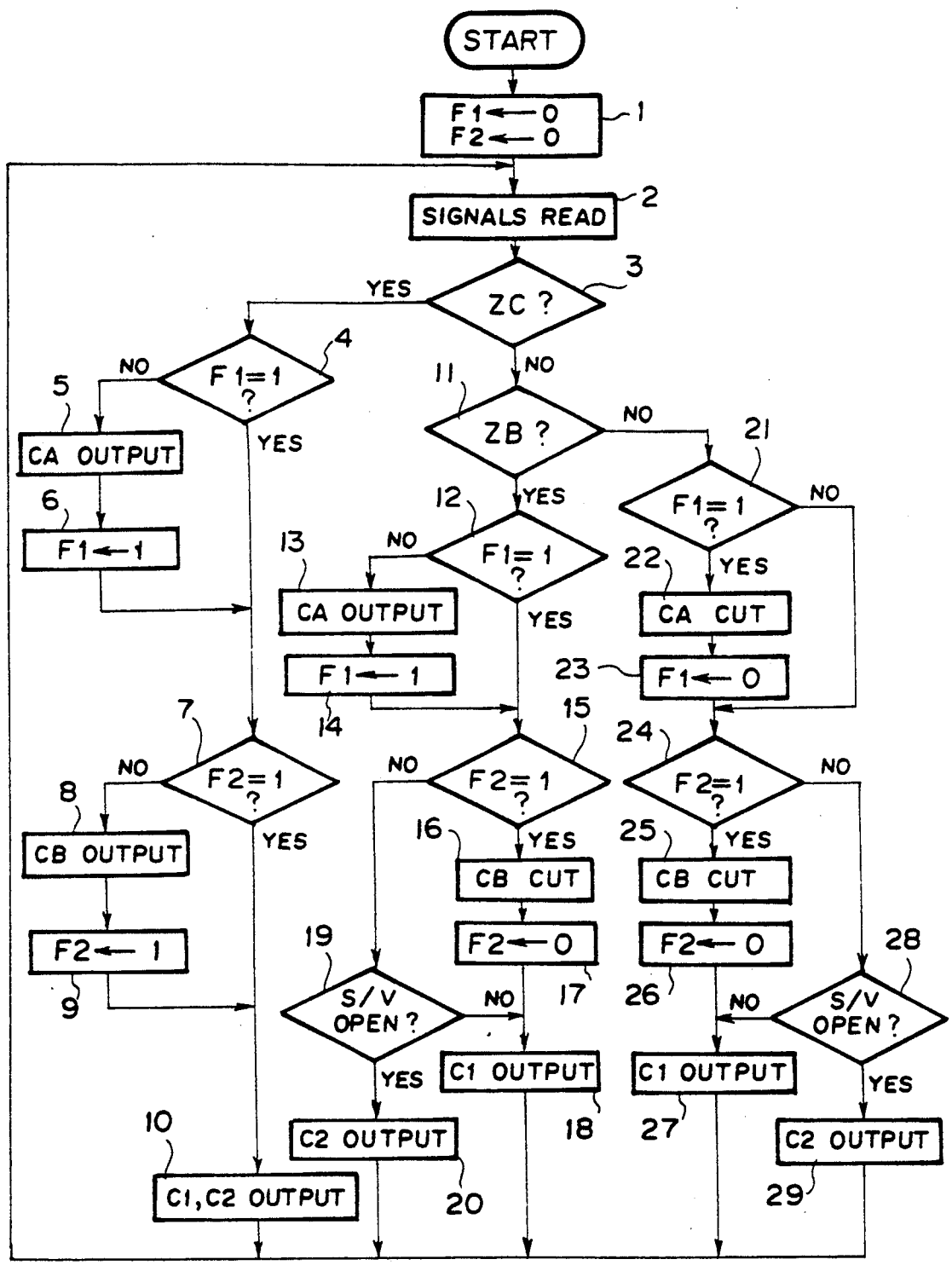
FIG. 8 is a flow chart for illustrating a program which the control unit performs in controlling the intake system.

FIG. 8 shows an example of a program which the control unit 160 performs in controlling the valves 26 and 28 and the fuel injectors 40 and 44 when the control unit 160 is formed of a microcomputer.

In FIG 8, the control unit 160 initializes first and second valve position flags F1 and F2 to 0 and then reads the output signals described above. (steps 1 and 2) Then the control unit 160 determines the step 3 whether the operational condition of the engine is in the heavy load range ZC according to the data map shown in FIG. 7 on the basis of the amount of intake air QA and the engine speed NE as represented by the output signals SA and SN. When it is determined that the operating condition of the engine is in the heavy load range ZC, the control unit 160 determines in step 4 whether the first valve position flag F1 is 1. When it is determined that the first valve position flag F1 is not 1, the control unit 160 starts output of driving signal CA to the first actuator 140 and then sets the first valve position flag F1 to 1. (steps 5 and 6) Thereafter the control unit 160 proceeds to step 7. When it is determined in step 4 that the first valve position flag F1 is 1, the control unit 160 directly proceeds to step 7. In step 7, the control unit 160 determines whether the second valve position flag F2 is 1. When it is determined in step 7 that the second valve position flag F2 is not 1, the control unit 160 starts output of driving signal CB to the second actuator 143 and then sets the second valve position flag F2 to 1. (steps 8 and 9) Thereafter the control unit 160 proceeds to step 10. When it is determined in step 7 that the second valve position flag F2 is 1, the control unit 160 directly proceeds to step 10. In step 10, the control unit 160 outputs the fuel injection signals C1 and C2 to the first and second fuel injectors 40 and 40 at predetermined timings. Thereafter the control unit 160 returns to step 2.

On the other hand, when it is determined in step 3 that the operating condition of the engine is not in the heavy load range, the control unit 160 determines in step 11 whether the operating condition of the engine is in the middle load range ZB. When it is determined that the operating condition of the engine is in the middle load range ZB, the control unit 160 determines in step 12 whether the first valve position flag F1 is 1. When it is determined that the first valve position flag F1 is not 1, the control unit 160 starts output of driving signal CA to the first actuator 140 and then sets the first valve position flag F1 to 1. (steps 13 and 14) Thereafter the control unit 160 proceeds to step 15. When it is determined in step 12 that the first valve position flag F1 is 1, the control unit 160 directly proceeds to step 15.

In step 15, the control unit 160 determines whether the second valve position flag F2 is 1. When it is determined that the second valve position flag F2 is 1, the control unit 160 interrupts output of the driving signal CB to the second actuator 143 and then resets the second valve position flag F2 to 0. (steps 16 and 17) Thereafter the control unit 160 proceeds to step 18. On the other hand, when it is determined in step 15 that the second valve position flag F2 is not 1, the control unit 160 determines in step 19 whether the secondary valves 28 have been in the open position on the basis of the output signal SK of the second valve position sensor 147. When it is determined that the secondary valves 28 have not been in the open position, the control unit 160 proceeds to step 18 and otherwise to step 20. In step 18 the control unit 160 outputs the fuel injection signal C1 to the first fuel injectors 40 at a predetermined timing and in step 20, the control unit 160 outputs the fuel injection signal C2 to the second fuel injectors 44 at a predetermined timing. After the step 18 or 20, the control unit 160 returns to step 2.

When it is determined in step 11 that the operating condition of the engine is not in the middle load range, the control unit 160 determines in step 21 whether the first valve position flag F1 is 1. When it is determined that the first valve position flag F1 is 1, the control unit 160 interrupts output of the driving signal CB to the first actuator 140 and then resets the first valve position flag F1 to 0. (steps 22 and 23) Thereafter the control unit 160 proceeds to step 24. When it is determined in step 21 that the first valve position flag F1 is not 1, the control unit 160 directly proceeds to step 24.

In step 24, the control unit 160 determines whether the second valve position flag F2 is 1. When it is determined that the second valve position flag F2 is 1, the control unit 160 interrupts output of the driving signal CB to the second actuator 143 and then resets the second valve position flag F2 to 0. (steps 25 and 26) Thereafter the control unit 160 proceeds to step 27. On the other hand, when it is determined in step 24 that the second valve position flag F2 is not 1, the control unit 160 determines in step 28 whether the secondary valves 28 have been in the open position on the basis of the output signal SK of the second valve position sensor 147. When it is determined that the secondary valves 28 have not been in the open position, the control unit 160 proceeds to step 27 and otherwise to step 29. In step 27 the control unit 160 outputs the fuel injection signal C1 to the first fuel injectors 40 at a predetermined timing and in step 29, the control unit 160 outputs the fuel injection signal C2 to the second fuel injectors 44 at a predetermined timing. After the step 27 or 29, the control unit 160 returns to step 2.

Though, in the embodiment described above, the secondary valves 28 are positioned in the closed position during both the light load operation and the middle load operation of the engine, the secondary valves 28 may be positioned in the closed position only during the light load operation of the engine. In such a case, when some trouble occurs and the secondary valves 28 are disabled to move to the closed position even when the operating condition of the engine is in the light load range, the control unit 160 controls the first fuel injectors 40 and the second fuel injectors 44 so that fuel is injected from the second fuel injectors 44 instead of the first fuel injectors 40 during the light load operation of the engine.

Figure 9:
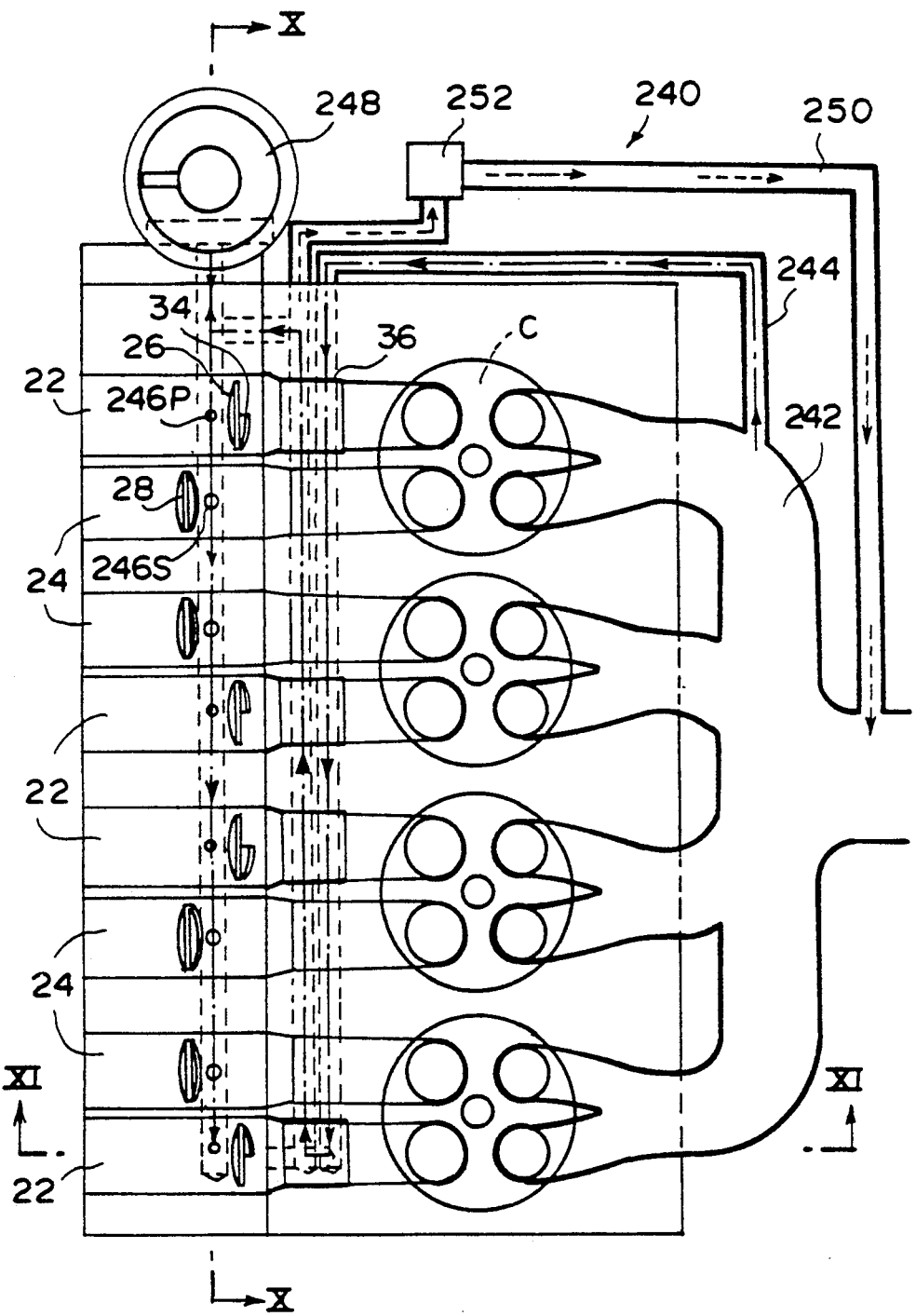
FIG. 9 is a schematic view of an engine provided with an intake system in accordance with another embodiment of the present invention.
Figure 10:
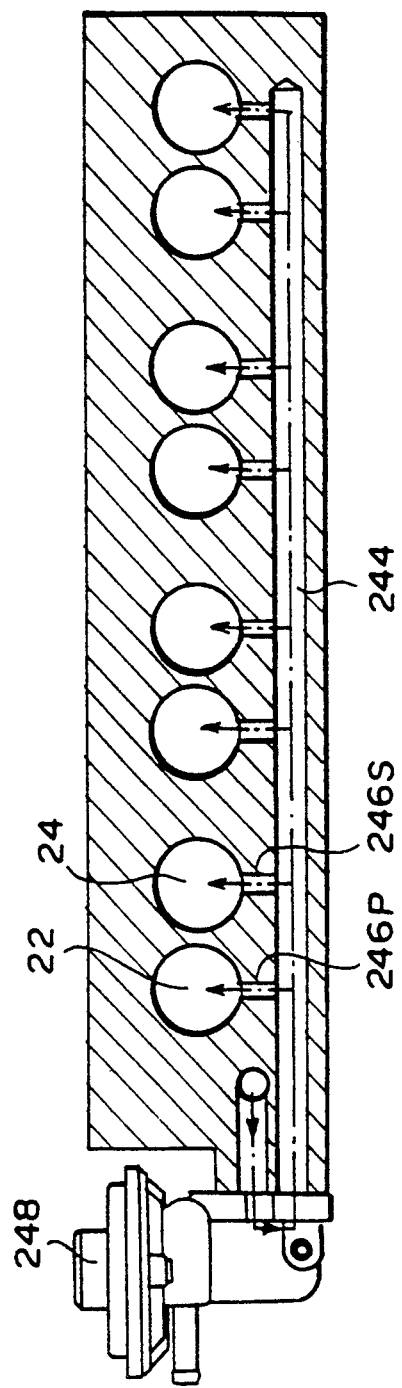
FIG. 10 is a cross-sectional view taken along line X—X in FIG. 9.
Figure 11:
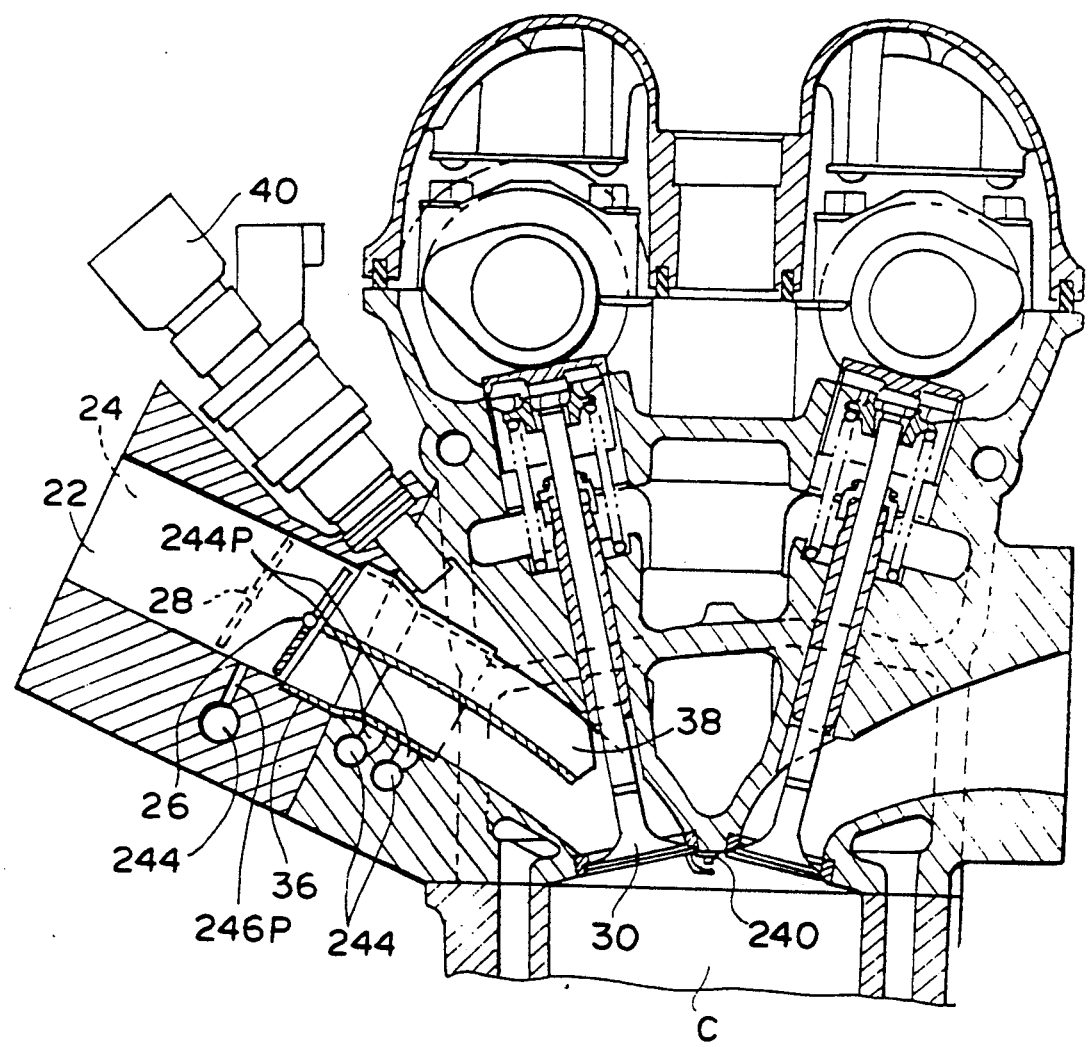
FIG. 11 is a cross-sectional view taken along line XI—XI in FIG. 9, FIGS. 12, 12A and 12B are flow charts for illustrating a program which the control unit performs in controlling the intake system in still another embodiment of the present invention.

The intake system in accordance with another embodiment of the present invention shown in FIGS. 9 to 11 is provided with an exhaust gas recirculation system. This intake system is substantially the same as that of the preceding embodiment except that the exhaust gas recirculation system 240 is added, and accordingly the parts analogous to those in the preceding embodiment are given the same reference numerals and will not be described in detail here.

As shown in FIG. 9, the exhaust gas recirculation system 240 comprises an exhaust gas recirculation passage 244 for returning a part of exhaust gas from an exhaust passage 242 to the primary and secondary intake passages 22 and 24. The exhaust gas recirculation passage 244 is connected to the primary intake passages 22 upstream of the respective primary valves 26 and to the secondary intake passages 24 downstream of the respective secondary valves 28. The exhaust gas recirculation passage 244 is connected to each of the primary intake passages 22 by way of a first opening 246p and to each of the secondary intake passages 24 by way of a second opening 246s, the second opening 246s being larger than the first opening 246p in diameter. Further the exhaust gas recirculation passage 244 is provided with a control valve 248 for controlling the amount of the part of the exhaust gas to be recirculated.

As the flow of recirculated exhaust gas is shown by chained-line arrows in FIG. 9, the exhaust gas recirculation passage 244 is U-shaped to cross all the primary intake passages 22 and the secondary intake passages 24 back and forth. As shown in FIG. 11, the exhaust gas recirculation passage 244 is provided with extensions 244p two of which lead exhaust gas to the tubular portion 36b of the insert member 36 in each of the primary intake passages 22. One of the extensions 244p for each primary intake passage 22 is connected to the forward path of the U-shaped exhaust gas recirculation passage 244 and the other is connected to the rearward path of the same. Further each extension 244p is formed arcuately along the tubular portion 36b of the insert member 36 in order to increase the area over which the recirculated exhaust gas can contact with the tubular portion 36b.

A bypass passage 250 is connected between the exhaust passage 242 and a portion of the exhaust gas recirculation passage 244 just upstream of the control valve 248. A relief valve 252 is provided in the bypass passage 250 to open and close the same according to the operating condition of the control valve 248. That is, the relief valve 252 is closed so long as the amount of the recirculated exhaust gas controlled by the control valve 148 is not zero and is opened when the control valve 248 sets the amount of the recirculated exhaust gas to zero and the pressure in the exhaust gas recirculation passage 244 increases. When the relief valve 252 opens, the recirculated exhaust gas returns to the exhaust passage 242 through the bypass passage 250.

In this embodiment, since the recirculated exhaust gas is introduced into the primary intake passages 22 upstream of the primary valves 26, the recirculated exhaust gas is also passed through the cutaway portions of the primary valves 26 during light load operation of the engine, whereby increase of burning temperature in the combustion chamber can be suppressed without adversely affecting formation of swirl. Further since the recirculated exhaust gas is introduced into the secondary intake passages 24 upstream of the secondary valves 28 and is subjected to intake vacuum during the middle load operation of the engine when the secondary valves 28 are in the closed position, the recirculated exhaust gas can be fed to the secondary intake passages 24 as soon as the secondary valves 28 are moved to the open position, whereby response of the exhaust gas recirculation system 240 to change of the operating condition of the engine to the heavy load range can be improved. Further since the first openings 246p through which the exhaust gas recirculation passage 244 communicates with the primary intake passages 22 is smaller than the second openings 246s through which the exhaust gas recirculation passage 244 communicates with the secondary intake passages 24, the recirculated exhaust gas cannot be introduced into the primary intake passages 22 in an excess amount during the light or middle load operation of the engine, and at the same time, a sufficient amount of recirculated exhaust gas can be introduced into the secondary intake passages 24 during the heavy load operation of the engine.

Since the exhaust gas recirculation passage 244 is U-shaped and crosses twice the primary intake passages 22 and the secondary intake passages 24, intake air flowing through the primary and secondary intake passages 22 and 24 can be warmed by heat of the recirculated exhaust gas. Especially in the case of the primary intake passages 22, intake air flowing therethrough can be more effectively warmed since the recirculated exhaust gas is brought into contact with the tubular portions 36b through the extensions 244p. Further by virtue of the relief valve 252 provided in the bypass passage 250, the recirculated exhaust gas is permitted to flow even if the amount of exhaust gas to be returned to the intake passages is zero.

In the embodiment described above, the exhaust gas recirculation passage 244 is connected to the primary intake passages 22 and the secondary intake passages 24 in series. However when the exhaust gas recirculation passage 244 is connected to adjacent two primary intake passages 22 by way of a branch passage which further branches at the middle between the two primary intake passages 22 into a pair of passages each connected to one of the adjacent two primary intake passages 22, the recirculated exhaust gas can be uniformly distributed to the two primary intake passages 22. Similarly when the exhaust gas recirculation passage 244 is connected to adjacent two secondary intake passages 24 by way of a branch passage which further branches at the middle between the two secondary intake passages 24 into a pair of passages each connected to one of the adjacent two secondary intake passages 24, the recirculated exhaust gas can be uniformly distributed to the two secondary intake passages 24.

Figure 12B:
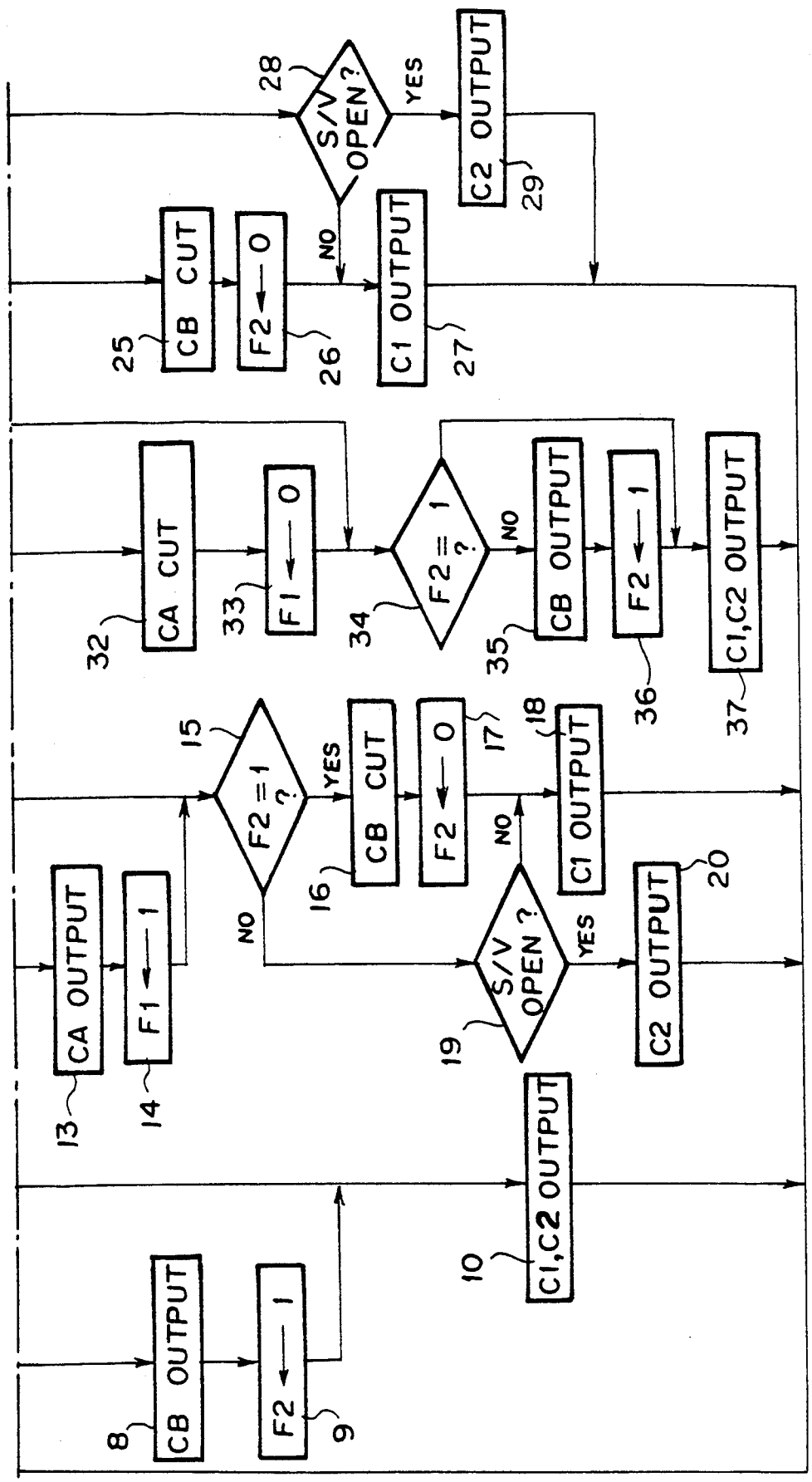

Though, in the preceding embodiment, the secondary valves 28 are held in the closed position in the middle load range, the secondary valves 28 may be held in the open position and the primary valves 26 may be held in the closed position while fuel is injected from both the first and second fuel injectors 40 and 44 when the engine is accelerated in the middle load range as shown in the flow chart in FIG. 12, whereby the amount of intake air can be quickly increased and torque shock can be prevented during acceleration.

The flow chart shown in FIG. 12 is substantially the same as that shown in FIG. 8 except that steps 30 to 37 are added to the flow chart shown in FIG. 8, and accordingly only steps 30 to 37 will be described here. When it is determined in step 11 that the operating condition of the engine is in the middle load range ZB, the control unit 160 determines whether the engine is being accelerated and when it is determined that the engine is not being accelerated, the control unit 160 proceeds to step 12. Otherwise the control unit 160 proceeds to step 31 and determines whether the first valve position flag F1 is 1. When it is determined that the first valve position flag F1 is 1, the control unit 160 interrupts output of the driving signal CA to the primary valves 26 and resets the first valve position flag F1 to 0. (steps 32 and 33) Thereafter the control unit 160 proceeds to step 34. When it is determined that the first valve position flag F1 is not 1, the control unit 160 directly proceeds to step 34. In step 34, the control unit 160 determines whether the second valve position flag F2 is 1. When it is determined that the second valve position flag F2 is not 1, the control unit 160 starts output of the driving signal CB to the secondary valves 28 and sets the second valve position flag F2 to 1. (steps 35 and 36) Thereafter the control unit 160 proceeds to step 37. When it is determined in step 34 that the second valve position flag F2 is 1, the control unit 160 directly proceeds to step 37. In step 37, the control unit 160 outputs the injection pulse signals C1 and C2. Then the control unit 160 returns to step 2.

Though, in the embodiments described above, the cutaway portion 34 is a quadrant in shape and the swirl forming passage 38 is a quadrant in cross-section, the shapes of the cutaway portion 34 and the swirl forming passage 8 need not be limited to a quadrant so long as swirl of intake air can be formed in the combustion chambers.

It is preferred that the amount of fuel adhering to the insert member 36 be minimized. For example, the amount of fuel adhering to the insert member 36 can be minimized by coating the insert member, especially the part facing the swirl forming passage 38, with material such as teflon which suppresses adhesion of fuel to the insert member 36.

Figure 13:
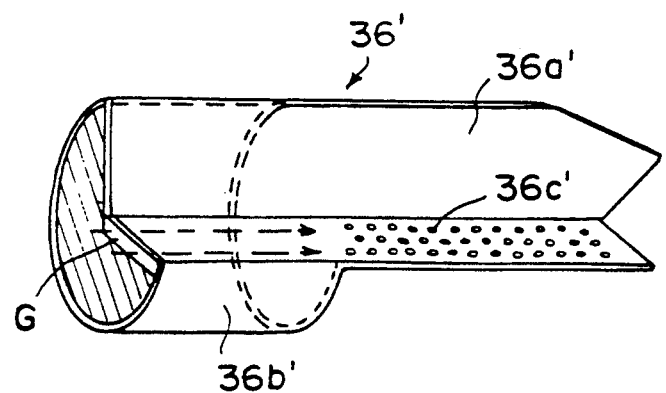
FIG. 13 is a perspective view showing a modification of the insert member.
Figure 14:
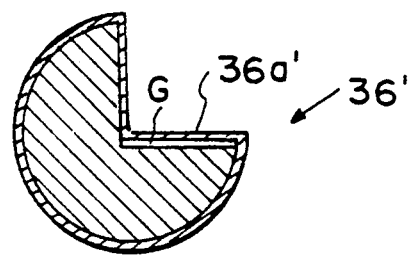
FIG. 14 is an end view of FIG. 13.
Figure 15:
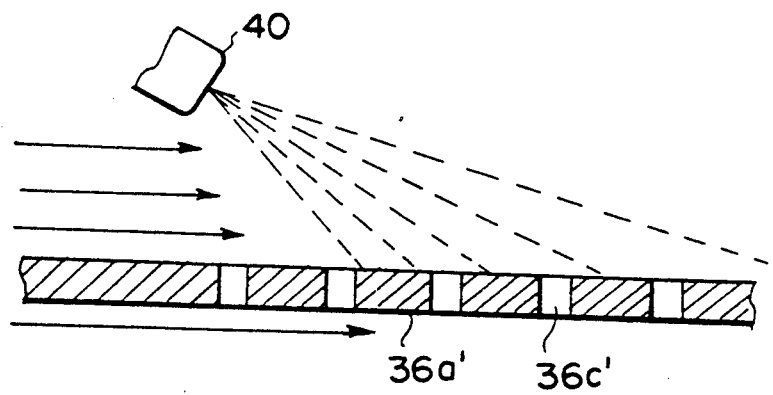
FIG. 15 is a schematic view for illustrating the operation of the insert plate.

FIG. 13 shows a preferred modification of the insert member 36. In FIG. 13, the insert member 36' is substantially the same in contour as that in the preceding embodiments but is provided with a plurality of small holes 36c' are formed in the horizontal plate portion of the partition wall portion 36a' and the horizontal plate portion is positioned slightly above the horizontal edge portion of the cutaway portion so that a small gap G is formed therebetween. The hatched portion in FIGS. 13 and 14 is projection of the primary valve 26.

Though the major part of intake air flowing through the primary intake passage 22 when the primary valve 26 is in the closed position flows along the upper surface of the horizontal plate portion of the partition wall portion 36a', a part of the intake air flows through the small ga G along the lower surface of the horizontal plate portion. A part of fuel adhering to the horizontal plate portion flows through the small holes 36c' to the lower surface of the horizontal plate portion of the partition wall portion 36a' and is easily atomized by the intake air flowing along the lower surface of the horizontal plate portion, whereby fuel control can be performed with a high accuracy.

What is claimed is:

1. An intake system for a multiple-cylinder engine in which each of the cylinders is provided with primary and secondary discrete intake passages which are separately open to the cylinder and the secondary discrete intake passage is provided with a secondary valve means which is moved between a closed position where it substantially closes the secondary discrete intake passage and an open position where it wide opens the secondary discrete intake passage, the secondary valve means being held in the closed position at least when the engine is operating in a light load range where the engine load is lighter than a predetermined load;

wherein both the primary and secondary discrete intake passages are straight and the primary discrete intake passage is provided with a primary valve means which is provided with an opening and is selectively positioned in a closed position where the primary valve means limits the effective cross-sectional area of the primary discrete intake passage to the cross-sectional area of the opening and in an open position where the primary intake discrete passage is substantially unobstructed at least when the secondary valve means is held in the closed position, the primary valve means being held in the closed position at least when the engine is operating in the light load range.

2. An intake system as defined in claim 1 in which a partition member is provided in the primary discrete intake passage downstream of the primary valve means and forms a swirl forming passage, in the primary intake passage, which substantially conforms to the opening of the primary valve means in cross-section and communicates the opening with the cylinder.

3. An intake system as defined in claim 2 in which first and second fuel supply means are provided, only the former being operated to supply fuel to the primary discrete intake passage in the light load range, both the first and second fuel supply means being operated to supply fuel to both the primary and secondary discrete intake passages when the engine is operating under load heavier than the predetermined load.

4. An intake system as defined in claim 3 in which said first fuel supply means comprises a first fuel injector which is provided in the swirl forming passage in each of the primary discrete intake passages and said second fuel supply means comprises a second fuel injector which is provided upstream of the upstream ends of the primary and secondary discrete intake passages where the primary and secondary discrete intake passages merge together.

5. An intake system as defined in claim 4 in which said partition member is provided with a plurality of small holes at a portion opposed to said first fuel injector and said opening of the primary valve means is slightly larger than the cross-section of the swirl forming passage defined by the partition member so that the opening extends beyond the outer surface of the portion opposed to said first fuel injector by a predetermined small amount.

6. An intake system as defined in claim 4 in which said partition member is coated with material which suppresses adhesion of fuel to the partition member at least at a portion opposed to said first fuel injector.

7. An intake system as defined in claim 1 in which said engine is provided with an exhaust gas recirculation system which returns a part of exhaust gas to the intake system wherein the exhaust gas recirculation system comprises an exhaust gas recirculating passage communicating with each of the primary discrete intake passages upstream of the primary valve means and with each of the secondary discrete intake passages downstream of the secondary valve means.

8. An intake system as defined in claim 7 in which the exhaust gas recirculating passage communicates with each of the primary discrete intake passages by way of an opening which is smaller than the opening by way of which the exhaust gas recirculating passage communicates with each of the secondary discrete intake passages.

9. An intake system as defined in claim 8 in which a partition member is provided in the primary discrete intake passage downstream of the primary valve means and forms a swirl forming passage, in the primary intake passage, which substantially conforms to the opening of the primary valve means in cross-section and communicates the opening with the cylinder.

10. An intake system as defined in claim 1 which further comprises a first fuel supply means provided in each of the primary discrete intake passages, a second fuel supply means provided upstream of the upstream ends of the primary and secondary discrete intake passages where the primary and secondary discrete intake passages merge together, a valve position detecting means which detects the position of the secondary valve means and a control means which operates the first fuel supply means when the secondary valve means are in the closed position during the light load operation of the engine and operates the second fuel supply means instead of the first fuel supply means when the secondary valve means are in the open position during the light load operation of the engine.

11. An intake system as defined in claim 10 in which said multiple-cylinder engine has an even number of cylinders and the primary and secondary discrete intake passages are arranged so that the secondary discrete intake passages for each pair of adjacent cylinders are adjacent to each other, and said second fuel supply means are provided one for each pair of cylinders.

12. An intake system as defined in claim 11 in which both the primary and secondary valve means are positioned in the closed position when the engine is operating in the light load range, the primary valve means is positioned in the open position while the secondary valve means is positioned in the closed position when the engine is operating in a middle load range where the engine load is heavier than said predetermined load and lighter than a second predetermined load, and both the primary and secondary valve means are positioned in the open position when the engine is operating in the heavy load range where the engine load is heavier than said second predetermined load.

13. An intake system as defined in claim 12 in which said multiple-cylinder engine has an even number of cylinders and the primary and secondary discrete intake passages are arranged so that the secondary discrete intake passages for each pair of adjacent cylinders are adjacent to each other, and said second fuel supply means are provided one for each pair of cylinders at a portion where each pair of adjacent secondary intake passages merge together.

14. An intake system as defined in claim 12 in which the primary valve means is positioned in the closed position while the secondary valve mean is positioned in the open position when the engine is accelerating in the middle load range.

15. An intake system as defined in claim 1 in which said opening of the primary valve means is in the form of a sectorial cutaway portion.

16. An intake system as defined in claim 15 in which said sectorial cutaway portion of the primary valve means is formed on the side remote from the secondary valve means.

17. An intake system for a multiple-cylinder engine in which each of the cylinders is provided with primary and secondary discrete intake passages which are separately open to the cylinder and the secondary discrete intake passage is provided with a secondary valve means which is moved between a closed position where it substantially closes the secondary discrete intake passage and an open position where it wide opens the secondary discrete intake passage, the secondary valve means being held in the closed position at least when the engine is operating in a light load range where the engine load is lighter than a predetermined load; and a partition member provided in the primary discrete intake passage downstream of a primary valve means forming a swirl forming passage in the primary intake passage, said partition member substantially conforming to the opening of the primary valve means in cross-section and communicating the opening with the cylinder;

wherein both the primary and secondary discrete intake passages are straight and the primary valve means is provided with an opening and is selectively positioned in a closed position where the primary valve means limits the effective cross-sectional area of the primary discrete intake passage to the cross-sectional area of the opening and in an open position where the primary valve means wide opens the primary discrete intake passage, the primary valve means being held in the closed position at least when the engine is operating in the light load range.

18. An intake system for a multiple-cylinder engine in which each of the cylinders is provided with primary and secondary discrete intake passages which are separately open to the cylinder and the secondary discrete intake passage is provided with a secondary valve means which is moved between a closed position where it substantially closes the secondary discrete intake passage and an open position where it wide opens the secondary discrete intake passage, the secondary valve means being held in the closed position at least when the engine is operating in a light load range where the engine load is lighter than a predetermined load;

wherein both the primary and secondary discrete intake passages are straight and the primary discrete intake passage is provided with a primary valve means which is provided with an opening and is selectively positioned in a closed position where the primary valve means limits the effective cross-sectional area of the primary discrete intake passage to the cross-sectional area of the opening and in an open position where the primary valve means wide opens the primary intake discrete passage, the primary valve means being held in the closed position at least when the engine is operating in the light load range; and an exhaust gas recirculation system for returning a part of exhaust gas to the intake system, the exhaust gas recirculation system including an exhaust gas recirculating passage communicating with each of the primary discrete intake passages upstream of the primary valve means and with each of the secondary discrete intake passages downstream of the secondary valve means.

19. An intake system for a multiple-cylinder engine in which each of the cylinders is provided with primary and secondary discrete intake passages which are separately open to the cylinder and the secondary discrete intake passage is provided with a secondary valve means which is moved between a closed position where it substantially closes the secondary discrete intake passage and an open position where it wide opens the secondary discrete intake passage, the secondary valve means being held in the closed position at least when the engine is operating in a light load range where the engine load is lighter than a predetermined load;

a first fuel supply means provided in each of the primary discrete intake passages; a second fuel supply means provided upstream of the upstream ends of the primary and secondary discrete intake passages where the primary and secondary discrete intake passages merge together; and a valve position detecting means which detects the position of the secondary valve means and a control means which operates the first fuel supply means when the secondary valve means are in the closed position during the light load operation of the engine and operates the second fuel supply means instead of the first fuel supply means when the secondary valve means are in the open position during the light load operation of the engine;

wherein both the primary and second discrete intake passages are straight and the primary discrete intake passage is provided with a primary valve means which is provided with an opening and is selectively positioned in a closed position where the primary valve means limits the effective cross-sectional area of the primary discrete intake passage to the cross-sectional area of the opening and in an open position where the primary valve means wide opens the primary intake discrete passage, the primary valve means being held in the closed position at least when the engine is operating in the light load range.

20. An intake system for a multiple-cylinder engine in which each of the cylinders is provided with primary and secondary discrete intake passages which are separately open to the cylinder and the secondary discrete intake passage is provided with a secondary valve means which is moved between a closed position where it substantially closes the secondary discrete intake passage and an open position where it wide opens the secondary discrete intake passage, the secondary valve means being held in the closed position at least when the engine is operating in a light load range where the engine is lighter than a predetermined load;

wherein both the primary and secondary discrete intake passages are straight and the primary discrete intake passage is provided with a primary valve means which is provided with an opening and is selectively positioned in a closed position where the primary valve means limits the effective cross-sectional area of the primary discrete intake passage to the cross-sectional area of the opening and in an open position where the primary valve means wide opens the primary intake discrete passage, the primary valve means being held in the closed position at least when the engine is operating in the light load range, and both the primary and secondary valve means are positioned in the closed position when the engine is operating in the light load range, the primary valve means is positioned in the open position and the primary intake passage is substantially unobstructed while the secondary vale means is positioned in the closed position when the engine is operating in a middle load range where the engine load is heavier than said predetermined load and lighter than a second predetermined load, and both the primary and secondary valve means are positioned in the open position when the engine is operating in the heavy load range where the engine load is heavier than said second predetermined load.

* * * * *